(12) United States Patent
Rudolf et al.

(10) Patent No.: US 8,681,816 B2
(45) Date of Patent: *Mar. 25, 2014

(54) METHOD AND APPARATUS FOR INDICATING A TEMPORARY BLOCK FLOW TO WHICH A PIGGYBACKED ACKNOWLEDGEMENT/NON-ACKNOWLEDGEMENT FIELD IS ADDRESSED

(75) Inventors: Marian Rudolf, Vitre (FR); Behrouz Aghili, Melville, NY (US); Prabhakar R. Chitrapu, Blue Bell, PA (US); Stephen G. Dick, Nesconset, NY (US); Philip J. Pietrazki, Huntington Station, NY (US); Yan Li, Center Valley, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,121

(22) Filed: Feb. 27, 2012

(65) Prior Publication Data

US 2012/0155394 A1 Jun. 21, 2012

Related U.S. Application Data

(63) Continuation of application No. 12/056,433, filed on Mar. 27, 2008, now Pat. No. 8,126,013.

(60) Provisional application No. 60/908,535, filed on Mar. 28, 2007, provisional application No. 60/945,057, filed on Jun. 19, 2007, provisional application No. 60/944,982, filed on Jun. 19, 2007, provisional application No. 60/945,034, filed on Jun. 19, 2007, provisional application No. 60/956,765, filed on Aug. 20, 2007.

(51) Int. Cl.
*H04J 3/24* (2006.01)
*H04J 3/18* (2006.01)
*H04J 3/16* (2006.01)
*H04L 12/42* (2006.01)
*H03M 13/00* (2006.01)

(52) U.S. Cl.
USPC .......... 370/473; 370/328; 370/449; 370/477; 370/469; 714/758

(58) Field of Classification Search
USPC ....................................... 370/328
See application file for complete search history.

(56) References Cited

U.S. PATENT DOCUMENTS 7,106,711 B2 9/2006 Otting et al.
2002/0170013 A1 11/2002 Bolourchi et al.
(Continued)

FOREIGN PATENT DOCUMENTS

GB 2 387 303 10/2003

OTHER PUBLICATIONS

Ericsson, "Implicit TFI Addressing in PAN", Change Request, 44.060 CR 0922, Rev. 3, Current Version 7.9.0, 3GPP TSG-GERAN2 Meeting #34-bis, G2-070258, (Povoa De Varzim, Portugal, Jun. 25-29, 2007).

(Continued)

*Primary Examiner* — Shaq Taha
(74) *Attorney, Agent, or Firm* — Volpe and Koenig, P.C.

(57) ABSTRACT

A method and apparatus for indicating a temporary block flow (TBF) to which a piggybacked acknowledgement/non-acknowledgement (PAN) field is addressed. A PAN check sequence (PCS) is created, for example using a cyclic redundancy check (CRC) encoding. The PCS is masked with a temporary flow identity (TFI) assigned to a TBF or a mask generated based on the TFI. A data block including the PAN field and the masked PCS is then processed for transmission. The mask may be generated by converting the TFI using an (M, N) code, M being not greater than the number of bits of the PCS and N being the number of bits of the TFI. With this scheme, a TFI may be transmitted in a PAN field without using explicit bits to identify the TBF.

12 Claims, 2 Drawing Sheets

(56) References Cited

U.S. PATENT DOCUMENTS

| | | |
|---|---|---|
| 2004/0058687 A1 | 3/2004 | Kim et al. |
| 2004/0252661 A1* | 12/2004 | Lintulampi et al. .......... 370/329 |
| 2007/0249343 A1 | 10/2007 | Olsson et al. |
| 2008/0056303 A1 | 3/2008 | Sebire et al. |

OTHER PUBLICATIONS

Ericsson, "Implicit TFI Addressing In PAN", Change Request, 44.060 CR 0922, Current Version 7.9.0, 3GPP TSG-GERAN2 Meeting #34-bis, G2-070172, (Povoa De Varzim, Portugal, Jun. 25-29, 2007).

Ericsson, "Introduction of Implicit TFI Addressing In PAN Field", 3GPP TSG GERAN2#34bis, G2-070171, Agenda Item 5.3.6, (Povoa De Varzim, Portugal, Jun. 25-29, 2007).

Huawei, "Discussion on Fast Ack/Nack Report," 3GPP TSG GERAN #33, GP-070172, Seoul, South Korea (Feb. 12-16, 2007).

Interdigital, "Indication Of TBF Identity In PAN", 3GPP TSG GERAN #34, GP-070602, (Shenzhen, China, May 14-18, 2007).

Nokia Corporation et al., "Introduction of Fast ACK/NACK Reporting", Change Request, 45.003 CR 0069, Rev. 2, Current Version 7.1.0, 3GPP TSG-GERAN Meeting #35, GP-071500, (Dublin, Ireland, Aug. 27-31, 2007).

Nokia et al., "Implicit TFI for Fast Ack/Nack Reporting", Change Request, 44.060 CR 0933, Current Version 7.9.0, 3GPP TSG-GERAN2#34bis, G2-070204, (Povoa De Varzim, Portugal, Jun. 25-29, 2007).

Rohde & Schwarz et al., "Text Case 34.x: Insufficient Handling Of SMS Timer TC1M", Change Request, 51.010-1 CR 3764, Current Version 7.4.0, 3GPP TSG-GERAN Meeting #33, GP-070078, (Seoul, Korea, Feb. 13-15, 2007).

Siemens et al., "Introduction of Fast Ack/Nack Reporting," GP-070273, 3GPP TSG-GERAN Meeting #33, Seoul, South Korea (Feb. 12-16, 2007).

Siemens Networks et al., "Introduction of Fast Ack/Nack Reporting," 3GPP TSG-GERAN Meeting WG2 #33bis, G2-070080 (Mar. 26-30, 2007).

Telefon AB LM Ericsson, "Introduction of Channel Coding for Red Hot and Huge", Change Request, 45.003 CR 0070, Rev. 2, Current Version 7.1.0, 3GPP TSG-GERAN #35, GP-071543, (Dublin, Ireland, Aug. 27-31, 2007).

Third Generation Partnership Project, "Technical Specification Group GSM/EDGE Radio Access Network; Feasibility study for evolved GSM/EDGE Radio Access Network (GERAN) (Release 7)", 3GPP TR 45.912 V7.2.0 (Feb. 2007).

Third Generation Partnership Project, "Technical Specification Group GSM/EDGE Radio Access Network; Feasibility study for evolved GSM/EDGE Radio Access Network (GERAN) (Release 7)", 3G TR 45.912 V7.0.0. (Oct. 2006).

Third Generation Partnership Project, "Technical Specification Group GSM/EDGE Radio Access Network; Channel coding (Release 7)", 3GPP TS 45.003 V7.4.0 (Feb. 2008).

Third Generation Partnership Project, "Technical Specification Group GSM/EDGE Radio Access Network; Channel coding (Release 7)", 3GPP TS 45.003 V7.1.0 (Mar. 2007).

Third Generation Partnership Project, "Technical Specification Group GSM/EDGE Radio Access Network; Multiplexing and multiple access on the radio path (Release 7)", 3GPP TS 45.002 V7.6.0 (Nov. 2007).

Third Generation Partnership Project, "Technical Specification Group GSM/EDGE Radio Access Network; Multiplexing and multiple access on the radio path (Release 7)", 3GPP TS 45.002 V7.3.0 (Mar. 2007).

Third Generation Partnership Project, "Technical Specification Group GSM/EDGE Radio Access Network; General Packet Radio Service (GPRS); Overall description of the GPRS radio interface; Stage 2 (Release 7)", 3GPP TS 43.064 V7.8.0 (Feb. 2008).

Third Generation Partnership Project, "Technical Specification Group GSM/EDGE Radio Access Network; General Packet Radio Service (GPRS); Overall description of the GPRS radio interface; Stage 2 (Release 7)", 3GPP TS 43.064 V7.4.0 (Mar. 2007).

Third Generation Partnership Project, "Technical Specification Group GSM EDGE Radio Access Network; Layer 1; General requirements (Release 7)", 3GPP TS 44.004 V7.1.0 (Dec. 2007).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060 V7.8.0 (Mar. 2007).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060 V7.12.0 (Mar. 2008).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8)," 3GPP TS 44.060 V8.0.0 (Mar. 2008).

Third Generation Partnership Project, "Technical Specification Group GSM/EDGE Radio Access Network; Radio subsystem link control (Release 7)", 3GPP TS 45.008 V7.7.0 (Feb. 2007).

Third Generation Partnership Project, "Technical Specification Group GSM/EDGE Radio Access Network; Radio subsystem link control (Release 7)", 3GPP TS 45.008 V7.11.0 (Feb. 2008).

Third Generation Partnership Project, "Technical Specification Group GSM/EDGE Radio Access Network; Mobile radio interface layer 3 specification; Radio Resource Control (RRC) protocol (Release 7)", 3GPP TS 44.018 V7.8.0 (Mar. 2007).

Third Generation Partnership Project, "Technical Specification Group GSM/EDGE Radio Access Network; Mobile radio interface layer 3 specification; Radio Resource Control (RRC) protocol (Release 7)", 3GPP TS 44.018 V7.12.0 (Mar. 2008).

Third Generation Partnership Project, "Technical Specification Group GSM/EDGE Radio Access Network; Mobile radio interface layer 3 specification; Radio Resource Control (RRC) protocol (Release 8)", 3GPP TS 44.018 V8.2.0 (Mar. 2008).

Third Generation Partnership Project, "Technical Specification Group Services and System Aspects; Technical Specification Group working methods (Release 1999)," 3GPP TR 21.900 V3.7.0 (Dec. 2003).

Third Generation Partnership Project, "Technical Specification Group Services and System Aspects; Technical Specification Group working methods (Release 4)," 3GPP TR 21.900 V4.1.0 (Dec. 2003).

Third Generation Partnership Project, "Technical Specification Group Services and System Aspects; Technical Specification Group working methods (Release 5)," 3GPP TR 21.900 V5.1.0 (Dec. 2003).

Third Generation Partnership Project, "Technical Specification Group Services and System Aspects; Technical Specification Group working methods (Release 6)," 3GPP TR 21.900 V6.4.0 (Dec. 2004).

Third Generation Partnership Project, "Technical Specification Group Services and System Aspects; Technical Specification Group working methods (Release 7)," 3GPP TR 21.900 V7.1.0 (Sep. 2005).

Third Generation Partnership Project, "Technical Specification Group Services and System Aspects; Technical Specification Group working methods (Release 7)," 3GPP TR 21.900 V7.3.0 (Sep. 2007).

Third Generation Partnership Project, "Technical Specification Group Services and System Aspects; Technical Specification Group working methods (Release 8)," 3GPP TR 21.900 V8.2.0 (Mar. 2008).

Third Generation Partnership Project, "Technical Specification Group GSM/EDGE Radio Access Network; Feasibility study for evolved GSM/EDGE Radio Access Network (GERAN) (Release 7)", 3GPP TR 45.912 V2.0.1 (Sep. 2006).

* cited by examiner

METHOD AND APPARATUS FOR INDICATING A TEMPORARY BLOCK FLOW TO WHICH A PIGGYBACKED ACKNOWLEDGEMENT/NON-ACKNOWLEDGEMENT FIELD IS ADDRESSED

CROSS REFERENCE TO RELATED APPLICATIONS

This application is a continuation of U.S. patent application Ser. No. 12/056,433 filed Mar. 27, 2008, which claims the benefit of U.S. Provisional Application Nos. 60/908,535 filed Mar. 28, 2007, 60/945,057 filed Jun. 19, 2007, 60/944,982 filed Jun. 19, 2007, 60/945,034 filed Jun. 19, 2007, and 60/956,765 filed Aug. 20, 2007, all of which are incorporated by reference as if fully set forth herein.

FIELD OF INVENTION

The present invention is related to a wireless communication system.

BACKGROUND

Latency reduction is one of the considerations in a GSM/EDGE radio access network (GERAN). Two techniques have been proposed for the latency reduction: reduced transmission time interval (RTTI) and fast acknowledgement/non-acknowledgement (ACK/NACK) reporting (FANR).

Conventionally, an ACK/NACK report is sent in an explicit message, also referred to as a radio link control/medium access control (RLC/MAC) control block. The ACK/NACK report is addressed to a particular radio resource, called a Temporary Block Flow (TBF).

A TBF is a temporal connection between a mobile station and a network to support a uni-directional transfer of data. A TBF is temporary and is maintained only for the duration of the data transfer. Each TBF is assigned a temporary flow identity (TFI) by the network. The TFI is unique among concurrent TBFs in each direction and is used instead of mobile station identity in the RLC/MAC layer. The same TFI is included in every RLC header belonging to a particular TBF.

It has been proposed to send the ACK/NACK report for a certain TBF as a "piggyback" on an RLC/MAC data block that may be addressed to another TBF. The field that carries the ACK/NACK report is referred to as a piggybacked ACK/NACK (PAN) field.

Since the PAN field is included in a data block that may be addressed to a different TBF, it is necessary to identify to which TBF the PAN field is addressed. Various proposals have been made to identify the correct TBF in the PAN field, including using a TFI or an uplink (UL) state flag (USF). During establishment of the uplink TBF, a USF is assigned to each mobile station. The USF is used by the network to indicate which mobile terminal is allowed to transmit in the following uplink radio block.

In either case, some number of bits, (typically ranging from three to five), should be dedicated to the TBF identity in the PAN field. It would be desirable to have an efficient method of sending the TBF identity in the PAN field such that no dedicated bits are needed to identify the TBF.

SUMMARY

A method and apparatus are described for indicating a TBF to which a PAN field is addressed. A PAN check sequence (PCS) is created, for example using a cyclic redundancy check (CRC) encoding. The PCS is masked with a TFI assigned to a TBF or a mask generated based on the TFI. A data block including the PAN field and the masked PCS is then processed for transmission. The mask may be generated by converting the TFI using an (M, N) code, M being the number of bits of the PCS and N being the number of bits of the TFI. With this scheme, a TFI may be transmitted in a PAN field without using explicit bits to identify the TBF.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station (MS), a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
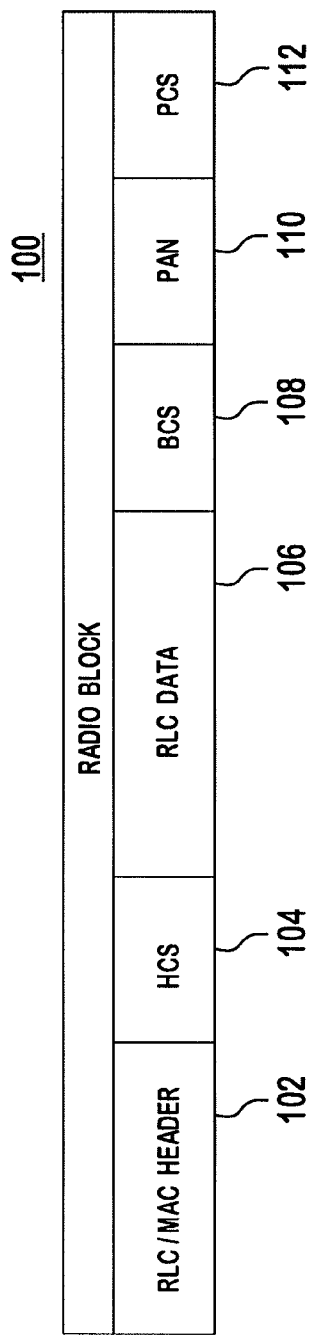
FIG. 1 shows an example radio block.

FIG. 1 shows an example radio block 100. The radio block 100 for data transfer includes one RLC/MAC header 102, a header check sequence (HCS) 104, one or more RLC data block(s) 106, a block check sequence (BCS) 108, a PAN field 110, and a PCS 112. The RLC/MAC header 102, the RLC data block(s) 106 and the PAN field 110 are coded separately for error detection and correction, and a separate checksum, (e.g., a cyclic redundancy check (CRC) checksum), is attached to each of them. The RLC/MAC header 102 contains a control field indicating whether a PAN field 110 is included or not in the radio block 100. The HCS 104 is used for error detection of the RLC/MAC header 102. The BCS 108 is used for error detection of the RLC data block 106. A separate BCS may be included for each RLC data block. The PAN field 110 contains piggy-backed ACK/NACK information sent in one direction to provide acknowledgement for a TBF in the other direction. The PCS 112 is used for error detection of the PAN field 110.

Figure 2:
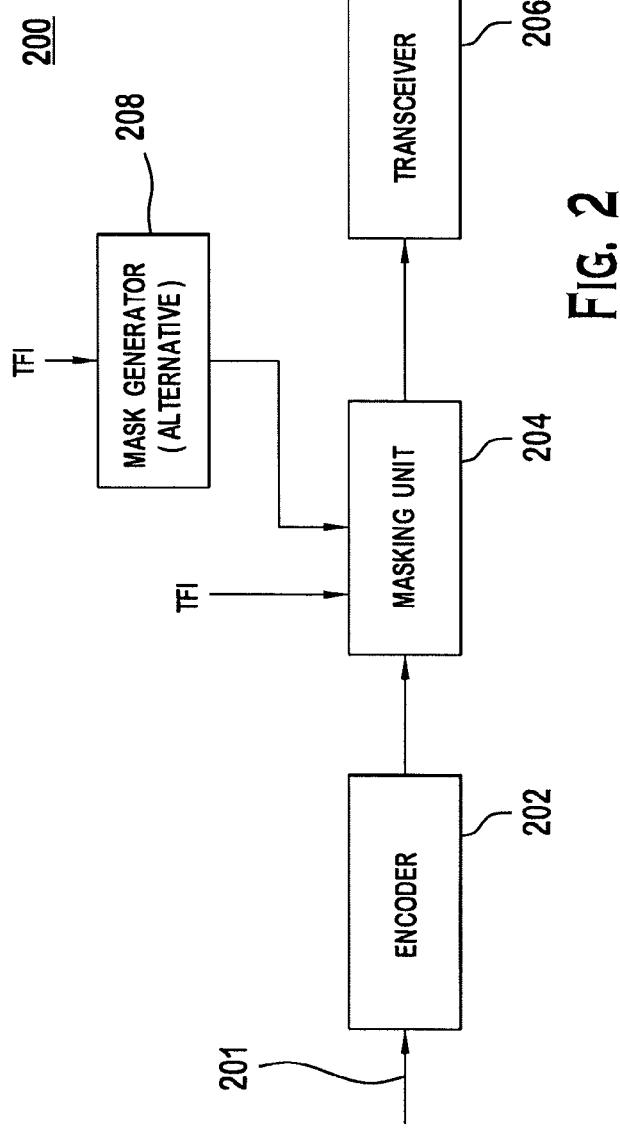
FIG. 2 is an example block diagram of a transmitting station.

FIG. 2 is an example block diagram of a transmitting station 200. The transmitting station 200 may be a WTRU, a Node-B, or any other apparatus or device. The transmitting station 200 includes an encoder 202, a masking unit 204, and a transceiver 206. A PAN field is input into the encoder 202. The encoder 202 generates a PCS based on the PAN field 201. For example, the encoder may be a cyclic redundancy check (CRC) encoder and the PCS may be a CRC checksum generated based on the PAN field 110. The masking unit 204 then masks the PCS with a TFI, (i.e., TFI is used as a mask). The masking of the PCS bits with the TFI may be performed by modulo-2 addition, (i.e., an exclusive OR (XOR) operation). The transceiver 206 sends a data block 100 including the PAN field 110 and the masked PCS 112. With this scheme, a TFI may be transmitted in a PAN field without using explicit bits to identify the TBF. Before transmission, a channel coding, (such as forward error correction (FEC) coding, rate matching, interleaving, or the like), may be performed.

At least one bit of the TFI is masked with at least one bit of the PCS. For example, when the number of PCS bits (M) is greater than the number of TFI bits (N), (e.g., N=5 and M=10), the TFI bits may be mapped to a portion or all of the PCS bits, (e.g., first N bits, last N bits, or a subset of the M bits). The opposite case is also possible if N is greater than M.

Alternatively, the transmitting station 200 may include a mask generator 208. The mask generator 208 generates a mask from the TFI, and the masking unit 204 masks the PCS with the mask generated by the mask generator 208. The N-bit TFI may be converted into an M-bit mask using an (M, N) code, (M is the number of bits of the PCS), and then the mask may be XORed with the PCS.

Alternatively, the N-bit TFI may be converted into an L-bit mask using an (L, N) code, where L<M, (M is the number of bits of the PCS), and then the mask may be XORed with the PCS. For example, when the number of PCS bits (M) is greater than the number of mask bits (L), (e.g., L=8 and M=10), the mask bits may be mapped to a portion or all of the PCS bits, (e.g., first L bits, last L bits, or a subset of the L bits). The opposite case is also possible.

The M-bit mask may be selected to provide improved separation, (e.g., Hamming distance), between the M bit sequences. For example, it may be obtained by binary multiplying the N-bit TFI with a generator matrix. A good masking code shall have the largest possible minimum distance and the lowest frequency of occurrence of this minimum value.

Example generator matrices of the linear binary codes with maximal minimum distances are provided below. In these examples, the TFI is assumed to be 5 bits long.

(1) A (6,5) code with minimum distance 2 (applicable if M=6):

$$\begin{matrix} 1 & 0 & 0 & 0 & 0 & 1 \\ 0 & 1 & 0 & 0 & 0 & 1 \\ 0 & 0 & 1 & 0 & 0 & 1 \\ 0 & 0 & 0 & 1 & 0 & 1 \\ 0 & 0 & 0 & 0 & 1 & 1 \end{matrix}.$$

(2) A (7,5) code with minimum distance 2 (applicable if M=7):

$$\begin{matrix} 1 & 0 & 0 & 0 & 0 & 1 & 1 \\ 0 & 1 & 0 & 0 & 0 & 1 & 1 \\ 0 & 0 & 1 & 0 & 0 & 1 & 1 \\ 0 & 0 & 0 & 1 & 0 & 1 & 1 \\ 0 & 0 & 0 & 0 & 1 & 1 & 1 \end{matrix}.$$

(3) An (8, 5) code with minimum distance 2 (applicable if M=8):

$$\begin{matrix} 1 & 0 & 0 & 0 & 0 & 1 & 1 & 0 \\ 0 & 1 & 0 & 0 & 0 & 1 & 0 & 1 \\ 0 & 0 & 1 & 0 & 0 & 0 & 1 & 1 \\ 0 & 0 & 0 & 1 & 0 & 1 & 1 & 1 \\ 0 & 0 & 0 & 0 & 1 & 1 & 1 & 1 \end{matrix}.$$

(4) A (9, 5) code with minimum distance 3 (applicable if M=9):

$$\begin{matrix} 1 & 0 & 0 & 0 & 0 & 0 & 1 & 1 & 1 \\ 0 & 1 & 0 & 0 & 0 & 1 & 0 & 1 & 1 \\ 0 & 0 & 1 & 0 & 0 & 1 & 1 & 0 & 1 \\ 0 & 0 & 0 & 1 & 0 & 1 & 1 & 1 & 0 \\ 0 & 0 & 0 & 0 & 1 & 1 & 1 & 1 & 1 \end{matrix}.$$

(5) A (10, 5) code with minimum distance 4 (applicable if M=10):

$$\begin{matrix} 1 & 0 & 0 & 0 & 0 & 0 & 1 & 1 & 1 & 1 \\ 0 & 1 & 0 & 0 & 0 & 1 & 0 & 1 & 1 & 1 \\ 0 & 0 & 1 & 0 & 0 & 1 & 1 & 0 & 1 & 1 \\ 0 & 0 & 0 & 1 & 0 & 1 & 1 & 1 & 0 & 1 \\ 0 & 0 & 0 & 0 & 1 & 1 & 1 & 1 & 1 & 0 \end{matrix}.$$

(6) An (11, 5) code with minimum distance 4 (applicable if M=11):

$$\begin{matrix} 1 & 0 & 0 & 0 & 1 & 1 & 0 & 0 & 0 & 1 & 0 \\ 0 & 1 & 0 & 0 & 1 & 0 & 1 & 0 & 0 & 1 & 0 \\ 0 & 0 & 1 & 0 & 1 & 0 & 0 & 1 & 0 & 1 & 0 \\ 0 & 0 & 0 & 1 & 1 & 0 & 0 & 0 & 1 & 1 & 0 \\ 0 & 0 & 0 & 0 & 0 & 1 & 1 & 1 & 1 & 1 & 1 \end{matrix}.$$

It should be noted that the above generator matrices are provided as an example, not as a limitation, and any other variances are also possible. For example, the matrices set forth above may be pre-multiplied and post-multiplied by binary permutation matrices, resulting in new matrices with the rows and/or the columns permuted. This column and/or row permutation will preserve the distance properties of the code.

Figure 3:
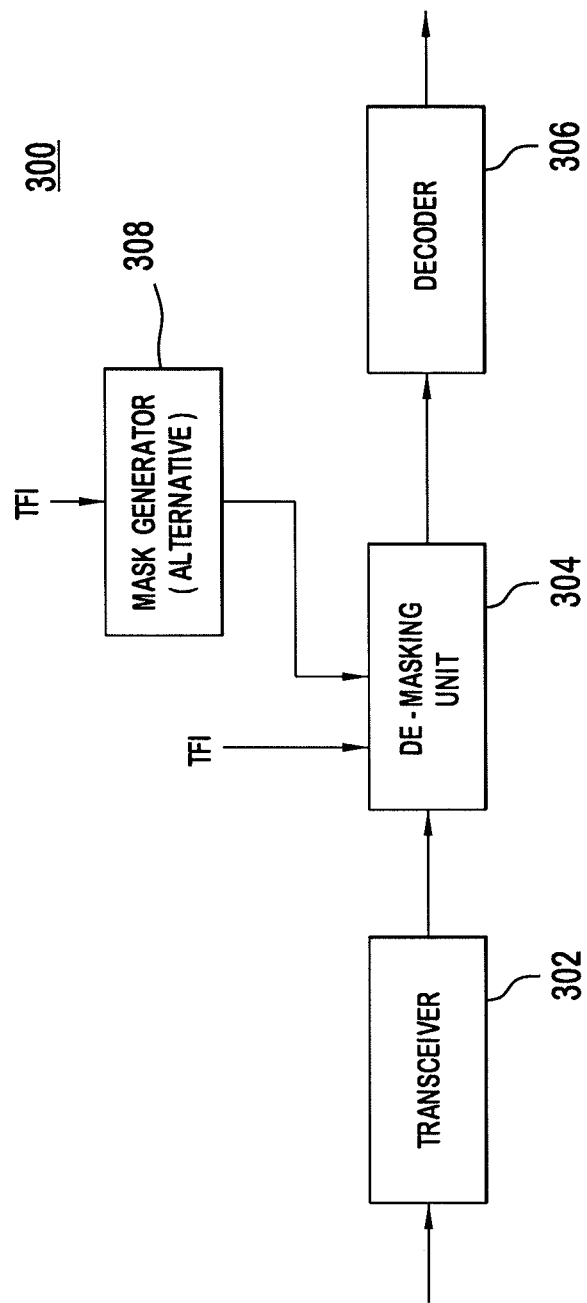
FIG. 3 is an example block diagram of a receiving station.

FIG. 3 is an example block diagram of a receiving station 300. The receiving station 300 may be a WTRU, a base station, or any other apparatus or device. The receiving station 300 includes a transceiver 302, a de-masking unit 304, and a decoder 306. The receiving station 300 may optionally further include a mask generator 308. The transceiver 302 receives a radio block including a PAN field and a masked PCS, such as the one shown in FIG. 1. The transceiver 302 outputs the PAN field and the masked PCS. The de-masking unit 304 de-masks the received masked PCS with its own TFI assigned to a TBF or alternatively with a mask generated by the mask generator 308 using its own TFI. The de-masking unit 304 outputs PAN bits and de-masked PCS bits. The decoder 306 then computes a PCS, (e.g., CRC bits), based on the received PAN field and compares the computed PCS with the de-masked received PCS. If the two PCSs agree, then the received PAN field is declared to be addressed to the receiving station 300. If the two PCSs do not agree, the PAN field is declared to be not addressed to the receiving station 300 and then may be discarded.

Alternatively, the decoder 306 may compute a PCS, (e.g., using CRC), and then mask the computed PCS with its TFI or a mask generated based on the TFI and then compare the computed masked PCS to the received masked PCS.

The receiving station 300 may need to decode the received PAN against more than 1 stored TFIs because the receiving station 300 may be allocated more than one TBF, and each TBF has a TFI of its own. When multiple TBFs are allocated to the receiving station 300, the receiving station 300 determines which TBF the PAN is addressed by de-masking against each possible TFI corresponding to its allocated TBFs.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a Global System for Mobile Communication (GSM)/Enhanced Data Rates for Global Evolution (EDGE) Radio Access Network (GERAN) compliant wireless transmit/receive unit (WTRU), the method comprising:
    receiving a first data block associated with a downlink temporary block flow (TBF), wherein the first data block includes a first header that includes a temporary flow identity (TFI) that identifies the downlink TBF;
    generating a piggybacked acknowledgement/non-acknowledgement (PAN) field corresponding to the downlink TBF;
    generating a PAN check sequence (PCS) based on the PAN field;
    masking a subset of PCS bits with the TFI to generate a masked PCS;
    generating a second data block, associated with an uplink TBF, that includes a second header, a data part corresponding to the uplink TBF, the PAN field, and the masked PCS; and
    transmitting the second data block.

2. The method of claim 1, wherein the subset of PCS bits is a first N bits of the PCS bits, or a last N bits of the PCS bits.

3. The method of claim 1, wherein the PCS is generated by performing cyclic redundancy check (CRC) encoding with the PAN field.

4. A Global System for Mobile Communication (GSM)/Enhanced Data Rates for Global Evolution (EDGE) Radio Access Network (GERAN) compliant wireless transmit/receive unit (WTRU) comprising:
    a receiver configured to receive a first data block associated with a downlink temporary block flow (TBF), wherein the first data block includes a first header that includes a temporary flow identity (TFI) that identifies the downlink TBF;
    a processor configured to:
    generate a piggybacked acknowledgement/non-acknowledgement (PAN) field corresponding to the downlink TBF;
    generate a PAN check sequence (PCS) based on the PAN field;
    mask a subset of PCS bits with the TFI to generate a masked PCS; and
    generate a second data block, associated with an uplink TBF, that includes a second header, a data part corresponding to the uplink TBF, the PAN field, and the masked PCS; and
    a transmitter configured to transmit the second data block.

5. The WTRU of claim 4, wherein the subset of PCS bits is a first N bits of the PCS bits, or a last N bits of the PCS bits.

6. The WTRU of claim 4, wherein the processor is further configured to generate the PCS by performing cyclic redundancy check (CRC) encoding with the PAN field.

7. A method for use in a Global System for Mobile Communication (GSM)/Enhanced Data Rates for Global Evolution (EDGE) Radio Access Network (GERAN) compliant wireless transmit/receive unit (WTRU), the method comprising:
    transmitting a first data block associated with an uplink temporary block flow (TBF), wherein the first data block includes a first header that includes a temporary flow identity (TFI) that identifies the uplink TBF;
    receiving a second data block associated with a downlink TBF, wherein the second data block includes a header, a data part corresponding to the downlink TBF, a piggybacked acknowledgement/non-acknowledgement (PAN) field corresponding to the uplink TBF, and a masked PAN check sequence (PCS), wherein the masked PCS was masked with the TFI that identifies the uplink TBF; and
    de-masking the masked PCS using the TFI that identifies the uplink TBF.

8. The method of claim 7, wherein the de-masking further comprises: de-masking the masked PCS using all TFIs identifying all TBFs associated with the WTRU.

9. The method of claim 7, wherein the de-masking further comprises: performing cyclic redundancy check (CRC) decoding with the PAN field.

10. A Global System for Mobile Communication (GSM)/Enhanced Data Rates for Global Evolution (EDGE) Radio Access Network (GERAN) compliant wireless transmit/receive unit (WTRU) comprising:
    a transmitter configured to transmit a first data block associated with an uplink temporary block flow (TBF), wherein the first data block includes a first header that includes a temporary flow identity (TFI) that identifies the uplink TBF;
    a receiver configured to receive a second data block associated with a downlink TBF, wherein the second data block includes a header, a data part corresponding to the downlink TBF, a piggybacked acknowledgement/non-acknowledgement (PAN) field corresponding to the uplink TBF, and a masked PAN check sequence (PCS), wherein the masked PCS was masked with the TFI that identifies the uplink TBF; and a processor configured to de-mask the masked PCS using the TFI that identifies the uplink TBF.

11. The WTRU of claim 10, wherein the processor is further configured to de-mask the masked PCS using all TFIs identifying all TBFs associated with the WTRU.

12. The WTRU of claim 10, wherein the processor is further configured to de-mask the masked PCS by performing cyclic redundancy check (CRC) decoding with the PAN field.

* * * * *